(12) United States Patent
Hampshire, II et al.

(10) Patent No.: US 7,358,976 B2
(45) Date of Patent: Apr. 15, 2008

(54) METHODS FOR PROCESSING COLOR IMAGE DATA EMPLOYING A CHROMA, HUE, AND INTENSITY COLOR REPRESENTATION

(75) Inventors: John B. Hampshire, II, Poughkeepsie, NY (US); Mahesh Saptharishi, Brighton, MA (US)

(73) Assignee: VideoIQ, Inc., Waltham, MA (US)

( * ) Notice: Subject to any disclaimer, the term of this patent is extended or adjusted under 35 U.S.C. 154(b) by 638 days.

(21) Appl. No.: 10/811,376

(22) Filed: Mar. 25, 2004

(65) Prior Publication Data

US 2004/0234126 A1    Nov. 25, 2004

Related U.S. Application Data

(60) Provisional application No. 60/457,748, filed on Mar. 25, 2003.

(51) Int. Cl.
*G09G 5/02* (2006.01)
(52) U.S. Cl. ....................... 345/589; 382/162
(58) Field of Classification Search ............... 345/589; 382/162
See application file for complete search history.

(56) References Cited

U.S. PATENT DOCUMENTS

| | | | | |
|---|---|---|---|---|
| 5,089,976 | A * | 2/1992 | Cate et al. ................ | 356/402 |
| 5,317,648 | A * | 5/1994 | Sawada et al. ............ | 382/162 |
| 6,132,210 | A * | 10/2000 | Lehmann .................... | 433/26 |
| 2003/0016359 | A1* | 1/2003 | Jung et al. ................. | 356/419 |
| 2005/0054867 | A1* | 3/2005 | Franks ....................... | 554/83 |

OTHER PUBLICATIONS

Charles A. Poynton, "Frequently Asked Questions About Color," published on the Internet at www.inforamp.net/~poynton; poynton@inforamp.net. Copyright Mar. 2, 1997. 24 pages.

Fred W. Billmeyer, Jr. and Max Saltzman, *Principles of Color Technology*, Copyright 1981 by John Wiley & Sons, Inc. Title page, ISBN page, and pp. 18, 19, 28, 52, and two unnumbered pages.

\* cited by examiner

*Primary Examiner*—Kee M. Tung
*Assistant Examiner*—Javid A Amini
(74) *Attorney, Agent, or Firm*—Stoel Rives LLP

(57) ABSTRACT

A method senses electromagnetic energy associated with a source over an area in N frequency bands and generates color image data representing at least a portion of the area. The data are arranged as pixels, and the data for a given pixel comprise chroma, hue, and intensity values. The N frequency bands constitute a mathematical basis in N-dimensional space, and one band establishes a first reference vector in the space. Equal parts of all bands establish a second reference vector. A reference plane contains the first and second reference vectors. The data for the pixel correspond to a point in the space, and that point and the second reference vector define a plane of interest. Hue is an angle between the reference plane and the plane of interest. Chroma is an angle between the point and the second reference vector. Intensity is the point's Euclidean norm.

57 Claims, 8 Drawing Sheets
(7 of 8 Drawing Sheet(s) Filed in Color)

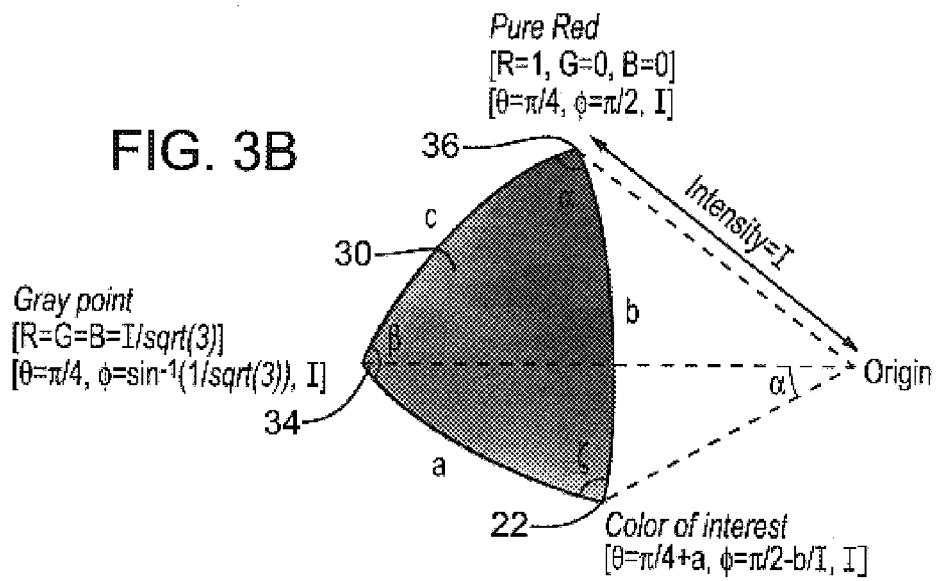
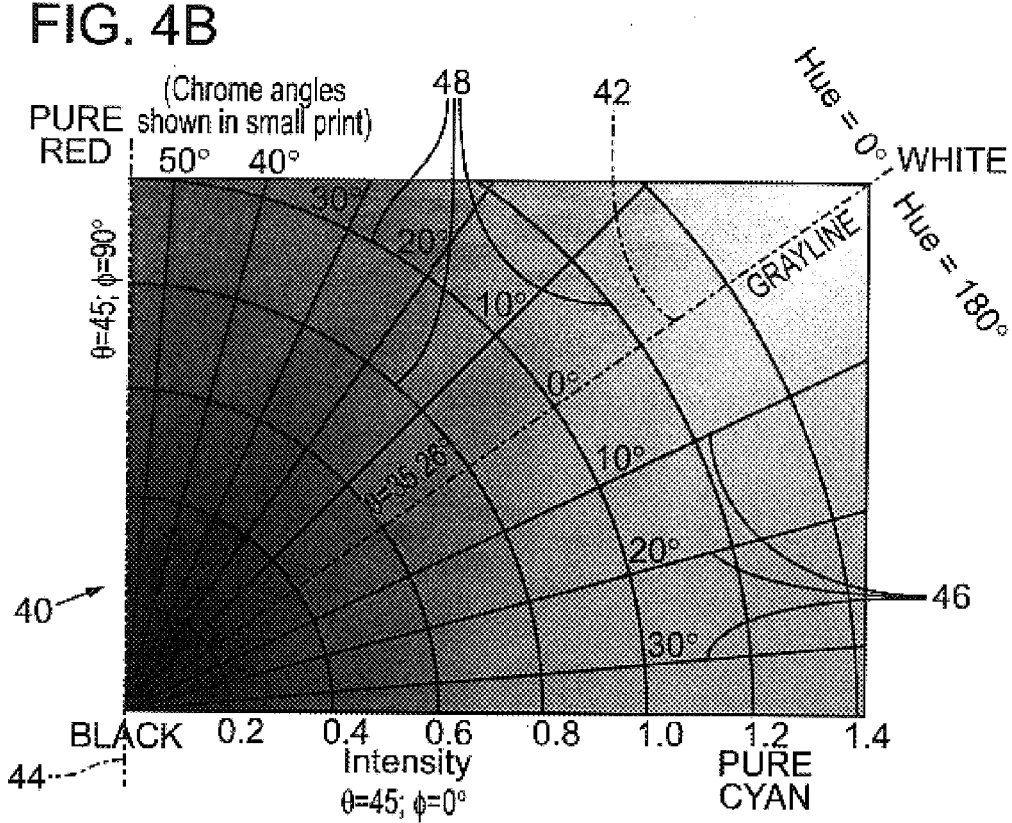

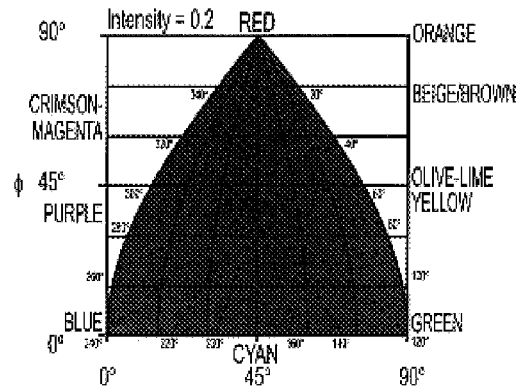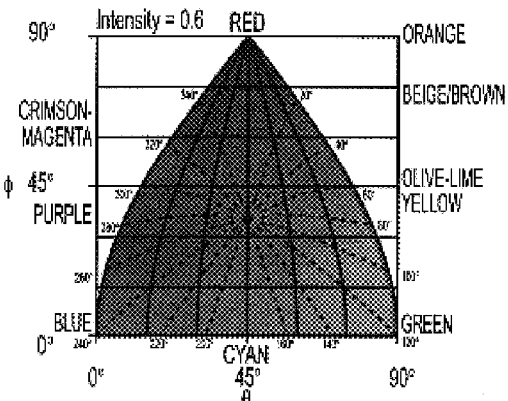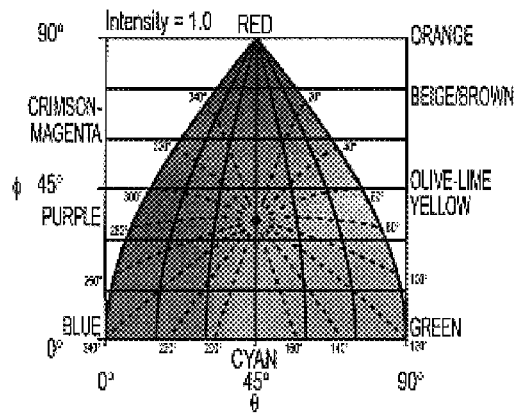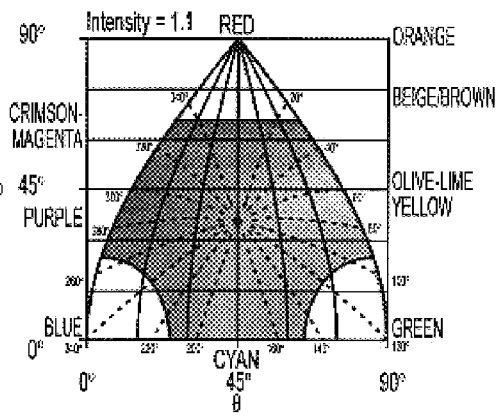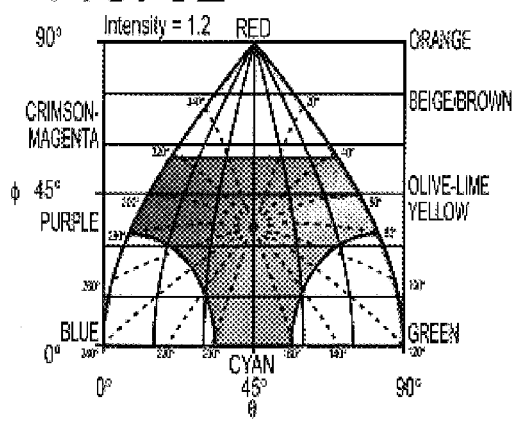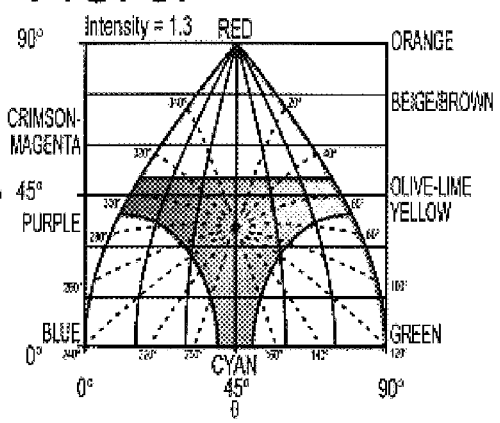

METHODS FOR PROCESSING COLOR IMAGE DATA EMPLOYING A CHROMA, HUE, AND INTENSITY COLOR REPRESENTATION

RELATED APPLICATIONS

This application claims priority under 35 U.S.C. § 119 to Provisional Application No. 60/457,748, filed Mar. 25, 2003, which is incorporated in its entirety herein by reference.

TECHNICAL FIELD

This disclosure relates generally to image analysis and more particularly to color image processing.

BACKGROUND

Prior workers have expended significant effort developing ways of representing color information in electronic display systems. FIG. 1 shows one of the earliest color representations, which is commonly referred to as the red, green, blue ("RGB") color cube representation (hereafter "the RGB cube 10"). Contours of constant color intensity are projected onto the visible exterior faces of the cube. The seven visible vertices correspond to the pure colors of red, green, blue, cyan, magenta, yellow, and white. The hidden [R=0, G=0, B=0] vertex corresponds to black.

The RGB cube 10 evolved from psychophysical experiments supporting the development of color television. The human eye was found to be responsive to RGB hues, so the RGB cube 10 naturally followed. The psychophysical experiments further indicated that the sensitivity of the eye to green was most closely correlated with its sensitivity to black-and-white intensity. Therefore, the National Television Standards Committee adopted a linear transformation from red, green, and blue to an approximate intensity-chrominance-luminance representation. This so-called YIQ representation and/or its related YUV and Y-Cr-Cb variants form the color space of the well-known Discrete Cosine Transform compression algorithms that are employed in the JPEG (JFIF), HDTV, MPEG-2, and MPEG-4 standards.

The Y—Cr-Cb representation is a linear transformation of the red-green-blue representation, in which the luminance term Y is dominated by the color green. This representation has been a staple of broadcast television and video for more than 50 years because it is easy to compute with linear systems, not because it is an accurate representation of intensity, chrominance, and luminance.

Another known color representation is based on the Munsell color classification system. That system specifies color in terms of three values: Munsell hue, Munsell chroma, and Munsell value. The Munsell color system can be visualized as a "tree." Along the center trunk of the tree is the achromatic value axis, which ranges from black, through shades of gray, to white. Extending out from the trunk are vertical planes, each of which represents a hue. In any given plane, the Munsell chroma value represents the shortest distance of a particular color from the trunk. Thus, the Munsell color system is essentially based on a cylindrical coordinate system. Because none of the Munsell coordinates are independent or uncorrelated with its peers, the Munsell system has limited usefulness for machine vision and image compression/coding.

One alternative color representation is the hue-lightness-saturation ("HLS") or hue-saturation-brightness ("HSB") color space. HLS is based on approximate planar geometry including loose, albeit easily computed, notions of lightness and saturation. Unfortunately, HLS is not a particularly accurate color representation, and therefore has limited machine vision and data compression potential.

Another alternative color representation is the International Color Consortium's 1976 CIElab color specification, which can be viewed as a nonlinear transformation of the RGB cube 10 to a luminance (l), red-green (a), and yellow-blue (b) space. This representation, although an international standard, is unacceptable for use in computer vision and lossy compression applications because both the a and b coordinates are necessary to describe a unique hue.

In addition to the human eye, display technology also sets requirements for color representations. Typical computer displays, such as cathode-ray-tubes ("CRTs") and liquid-crystal displays ("LCDs"), can typically render images having intensity ranges between 100:1 and 400:1, which correspond to dynamic ranges of 40 to 52 decibels ("dB"). Such dynamic ranges require only 6.64 to 8.64 bits to represent intensity faithfully, whereas RGB images are typically represented with 24 bits, which support a 129 dB dynamic range. No current display technology can render half that dynamic range, but because the RGB cube 10 is inefficient, the entire dynamic range is needed to render a rich color palette with high dynamic range.

SUMMARY

The invention generally utilizes a representation of color in terms of Chroma, Hue, and Intensity ("CHI") parameters.

In one respect, the invention is a machine vision method. As used herein, the phrase "machine vision" encompasses any and all generation or processing of data representing an image. The method senses light energy associated with a scene. The method also generates color image data representing at least a portion of the scene. The data are arranged as pixels, and the data for a given pixel comprise an intensity value, a hue value, and a chroma value (i.e., CHI values). The intensity value represents the total light energy associated with the pixel. The hue value represents a dominant or average frequency of the light energy associated with the pixel. The chroma value represents a measure of the light energy on a side of the visible spectrum complementary to the hue.

In another respect, the invention is a method for processing image data. The method obtains color image data having the properties described in the previous paragraph and processes that data. That processing optionally comprises compressing one or more of the chroma, hue, and intensity values, whereby the one or more compressed values can be stored, transmitted, or processed more efficiently.

In another respect, the invention is a method, which senses electromagnetic energy associated with a source over an area in N frequency bands, wherein N>1, and generates color image data representing at least a portion of the area. The data are arranged as pixels, and the data for a given pixel comprise an intensity value, a hue value, and a chroma value (i.e., CHI values). The N frequency bands constitute a mathematical basis in N-dimensional space, and one of the N frequency bands establishes a first reference vector in the space. Equal parts of all N frequency bands establish a second reference vector in the space. A reference plane in the space contains the first reference vector and the second reference vector. The data for the given pixel corresponds to a point in the N-dimensional space, such that the point corresponding to the data for the given pixel and the second reference vector define a plane of interest. The hue value is an angle between the reference plane and the plane of interest. The chroma value is an angle subtended in the plane of interest between the point corresponding to the data for the given pixel and the second reference vector. The intensity value is a Euclidean norm of the point corresponding to the data for the given pixel in the space.

In another respect, the invention is a method for processing image data. The method obtains color image data having the properties described in the previous paragraph and processes that data. That processing optionally comprises compressing one or more of the chroma, hue, and intensity values, whereby the one or more compressed values can be stored, transmitted, or processed more efficiently.

In yet other respects, the invention is computer-readable medium on which is embedded computer software that performs one or more of the above methods.

Additional details concerning the construction and operation of particular embodiments of the invention are set forth in the following sections. As one skilled in the art will appreciate, certain embodiments are capable of achieving certain advantages over the known prior art, including some or all of the following:

(1) The CHI color representation provides an accurate color representation system and method, especially under changing illumination conditions.

(2) Each of chroma, hue, and intensity, as defined herein, are largely invariant to changes in the other two, and most notably, hue is invariant to changes in illumination (i.e., intensity) under white light. Conversely, intensity is invariant under changes in hue. Chroma, on the other hand, is moderately correlated with both intensity and hue. The invariance of hue and intensity is advantageous in machine vision applications and minimally lossy color data compression.

(3) The CHI color representation has the capability to provide significant data compression without a corresponding loss of accuracy.

(4) The CHI color representation better exploits the advent of inexpensive digital computing devices and the need for highly compressed color data transmission.

(5) The CHI representation enables an object illuminated by colored light to be described as a white light-illuminated object plus a simple chroma-hue correction constant. Therefore, the chromatic signature of an object represented in CHI coordinates is, except for the correction constant, invariant to changes in both the color and intensity of the illumination source. Accordingly, the CHI representation provides a simple way for implementing color correction (or white balance) of a self-calibrated object. Moreover, regarding the color signatures of objects, lighting changes cause perceived color shifts. For example, if monitoring an individual based on a shirt color, the CHI representation can mathematically correct for color shifts caused as the individual moves from light into shadow or from one light source to another.

(6) Because the intensity and hue variables of the CHI representation are statistically uncorrelated, chromatic distortion, measured by peak signal-to-noise ratio ("PSNR"), can be decomposed into separate intensity and color components having tightly bounded mutual information.

(7) Moreover, because the intensity resolution of the human eye is far greater than its color resolution, the CHI representation provides superior lossy compression performance because it allows successive, rather than joint, compression of intensity and color. The overall PSNR can be tightly controlled while intensity and color components are assigned different acceptable distortion rates consistent with human perceptual acuity.

Those skilled in the art will appreciate these and other advantages of various embodiments of the invention upon reading the following detailed description of a preferred embodiment with reference to the below-listed drawings.

BRIEF DESCRIPTION OF THE DRAWINGS

This patent or application file contains at least one drawing executed in color. Copies of this patent or patent application publication with color drawings will be provided by the Office upon request and payment of the necessary fee.

FIG. 3B is an isometric color representation of the spherical triangle of FIG. 3A, illustrating Napier's Rules.

FIG. 4B is a planar color graphical representation of a hue reference plane containing all chromas and intensities of the primary color red and its complementary color cyan, according to one embodiment of the invention.

FIGS. 5A, 5B, 5C, 5D, 5E, 5F, 5G, 5H, and 5J are color orthographic projections of the polar CHI color representation for various intensities I, according to one embodiment of the invention.

DETAILED DESCRIPTION OF A PREFERRED EMBODIMENT

A. Overview

A CHI representation of color provides a framework for systems and methods for processing color data. The CHI parameters are chroma (C), hue (H), and intensity (I). The following qualitative description of those parameters is useful for understanding the CHI representation.

Intensity I represents the total light energy of a color across the entire spectrum of interest (typically the visible spectrum). Intensity conveys information regarding brightness and contrast, but no information about color. For a point source, the intensity I is proportional to the number of photons it emits. A scene can be modeled as a number of pixels, which are typically arranged in a two-dimensional rectangular array. As the size of the pixels become small, they come to resemble point sources of light. In such a case, the intensity of a pixel is closely correlated to the level of illumination on the scene. The more strongly the scene is illuminated, the more each of its constituent pixels reflects light, and thus the higher the pixels' intensities.

Hue H and choma C, on the other hand, convey color information. Hue describes the relative proportions of primary colors in a color of interest. More particularly, the hue H represents the wavelength(s) of light emitted by or reflected from a pixel or other light source. Different wavelengths correspond to different colors from violet (relatively short wavelength) to red (relatively long wavelength), and all the colors of the rainbow in between. If a point source emits only a single wavelength of light, its hue would specify that wavelength (while its intensity would specify how many photons are emitted). In the case of a point source emitting photons of different wavelengths, the hue represents the weighted average of all such wavelengths (while its intensity would represent the total number of photons of all wavelengths). As an example, if a source emits equal numbers of pure red and pure blue photons, then the resulting hue would be pure magenta. This concept can also be understood geometrically by way of vector addition in the RGB cube, as discussed below in relation to FIG. 4A.

Chroma C represents the degree of grayness of a color. The greater the chroma, the more vivid the color; the less the chroma, the more "washed-out" the color appears. As chroma approaches a maximum value, colors become their most vivid, and as chroma approaches zero, colors fade to gray. Vibrant colors have large chroma, whereas soft colors have low chroma. Black, white, and all grays are examples of colors with no chroma (i.e., achromatic). Pastels are examples of colors with low chroma. The primary colors red, green, and blue and their complements, cyan, magenta, and yellow are examples of colors with maximum chroma. With reference to the RGB cube 10, maximum chroma is along the outer surface of the cube, while chroma decreases as you move toward the interior diagonal connecting the black and white vertices of the cube.

Figure 1:
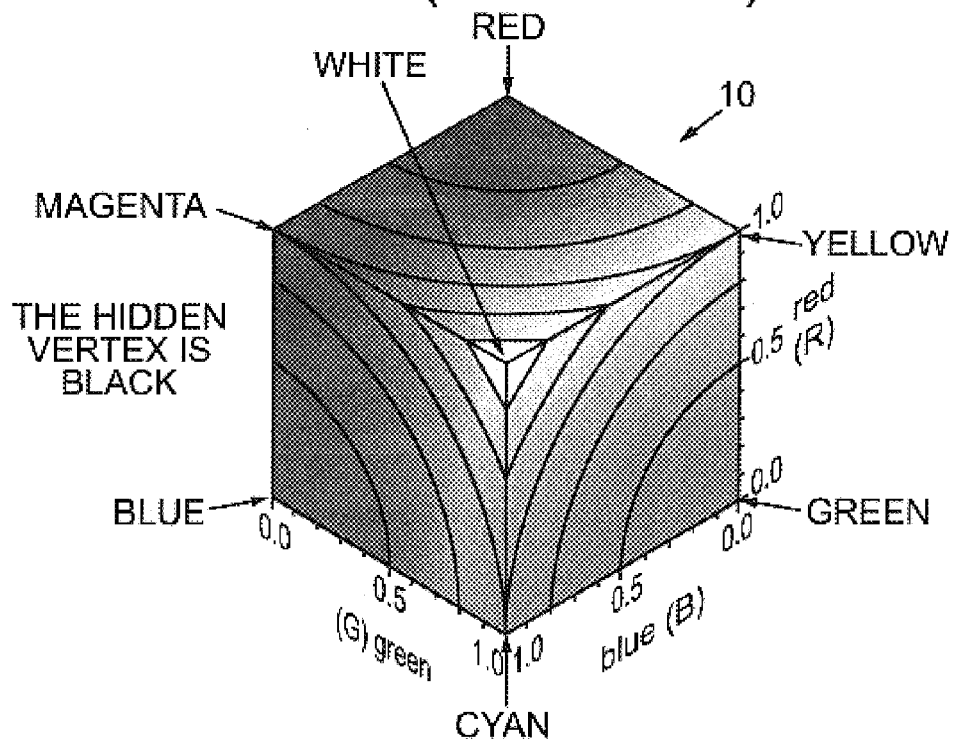
FIG. 1 is an isometric color view of a prior art RGB color cube shown from the perspective of a white [R=1, G=1, B=1] vertex.

Another way to understand chroma is to think of it as a measure of the distribution of wavelengths of photons coming from a source. Chroma is lessened by the presence of light at wavelengths on the complementary side of the spectrum. Complementary is meant in the sense that cyan is the complement of red, yellow is the complement of blue, and magenta is the complement of green. The complementary nature of the visible spectrum can be visualized as follows: imagine a rainbow; snip out a narrow vertical band of it from the top; then loop that band around so that its ends meet. Complementary colors are on opposite sides of the loop. Alternatively, look at FIG. 1; ignore that it is an isometric view of a cube; see it as a flat hexagon; now the outside edges are just like the rainbow loop. In either case, any given point has an opposite side (half circle or half hexagon border). The presence of light at wavelengths on the opposite (i.e., complementary) side of the hue lessens the chroma of the resulting color. Consider again the example of a pure magenta hue formed by equal parts red and blue photons. If some green photons are also present, then the effect is a washing out or graying of the resultant color. In that case, green photons would lessen the chroma of the resultant color.

While the preceding description is satisfactory for a three-dimensional color space of primary colors in the visible spectrum, it does not generalize to higher dimensions or other portions of the electromagnetic spectrum ("EMS"), to which a CHI color representation is very much useful. In general, The phenomenological basis of a CHI color representation relates to the EMS, which contains the radio frequency spectrum, thermal infrared spectrum, near infrared spectrum, visible light, ultraviolet, X-rays, etc. Ideally, the intensity of a signal in the overall EMS would be its total energy content; the hue of the signal would be the set of frequencies with non-zero energy, detected over the entire EMS (the signal's spectral signature); the chroma of the signal would be an energy ratio of (or a monotonic measure of divergence between) the signal's colored spectral signature and a "white" signal (i.e., one having its energy distributed uniformly over the entire EMS) of the same energy. In other words, the chroma value represents a measure of the relative amounts of colored (i.e., narrow spectrum) energy versus "white" (i.e., broad spectrum) energy in the EMS.

In practice, owing to cost, typical imaging sensors don't have high frequency resolution across the entire EMS. Rather, they tend to have multiple narrow-band filters that detect signal content in narrow bands of frequencies across some sub-set of the EMS. A charge coupled device ("CCD") camera is a familiar example of such an imaging sensor. It contains three narrow band filters (one for visible red light, one for visible green light, and one for visible blue light) with characteristics matched to those of the human eye. By capturing and recording light energy in these three narrow-band filters, the CCD camera can store an image that, when displayed on a suitable rendering device, constitutes a reasonable facsimile of the original image detected by the CCD sensor.

Within that practical framework, a CHI color representation can be described in terms of a general EMS sensor with a set of narrow-band filter/detectors numbering N. These N filter/detectors are characterized by the center frequency of their filter pass-band (i.e., the frequency in the middle of the range of frequencies detected by the filter/detector), and this center frequency is referred to as a "primary" frequency. The N primaries are assumed to constitute a mathematical basis, which is preferably orthonormal: that is, any signal detected by the sensor can be described by an ordered set of N energy values associated with the ordered list of primaries. Preferably, the N filter/detectors have matched sensitivities and matched, finite power capabilities, so their outputs are consistent with this orthonormal model.

Given an N-dimensional primary basis, a CHI color representation establishes two points of reference: a reference primary vector and a "grayline" vector. The reference primary is any one of the N primaries described above, and its corresponding vector is the N-dimensional vector having all zero-value elements except for the one corresponding to the reference primary, which has maximal value. The grayline is the N-dimensional vector having all maximal-value elements, corresponding to the sensor detecting all N primaries with maximal energy. For simplicity and without loss of generality, one can assume maximal energy is normalized to a unit value. The reference primary vector and the grayline vector, taken together, define an N−1 dimensional hyperplane called the "reference color plane."

When a sensor, as described above, detects a signal, it generates an N-dimensional vector of energies detected by each of the primary filter/detectors. That detected color vector can be compared to the reference color plane to compute the signal's hue; it can be compared to the grayline vector to compute the signal's chroma; and its magnitude is the signal's intensity.

Specifically, the detected color plane or plane of interest is defined as the plane that contains both the detected color vector and the grayline vector. Hue, chroma, and intensity can thus be defined as follows: The signal's hue is the angle between the detected color plane and the reference color plane; the signal's chroma is the angle between the detected color vector and the grayline vector; and the signal's intensity is the Euclidean norm of the detected color vector (i.e., the square root of the sum of the squared elements of the detected color vector). Mathematical expressions for the case in which N=3 are given later in this document; those expressions are easily generalized to the case in which N is some other number.

If the number of primaries N is greater than three, hue takes on a value between zero and $\pi$ radians (180 degrees). However, if N is three or less, additional constraints can be applied to the definition of hue such that it takes on a value between zero and $2\pi$ radians (360 degrees). Those constraints have the effect of creating a hue metric with less ambiguity.

Returning to the more intuitive case of a three-dimensional visible color space, as represented by the prior art RGB cube 10 having a three-dimensional Cartesian coordinate system with mutually orthogonal green, blue, and red axes, a convenient reference primary vector is the pure red vector from the black origin [R=0, G=0, B=0] to the red [R=1, G=0, B=0] vertex. Those two vectors define a reference color plane or hue reference plane. That hue reference plane contains the RGB cube 10's grayline and black/red edge and contains all the chromas and intensities for the pure-red hue and its complement pure cyan. All other hues are defined by the angle between the hue reference plane and a rotated plane containing the grayline. For any rotational angle referenced to zero (the red/cyan hue reference plane), the rotated plane contains all the possible chromas and intensities for two and only two complementary hues.

Therefore, in a CHI representation, chroma is defined by an angular measurement relative to the grayline. Contours of constant chroma are represented as radial lines emanating from the black end of the grayline, and contours of constant intensity are represented as arcs of constant radius from the black end of the grayline. All hues in a CHI representation are formed by angular variants of the hue reference plane containing and rotated about the grayline. Intensity I is defined as the distance from the black origin, and each intensity I represented in the RGB cube 10 defines the surface of a quarter hemisphere of radius I inside the RGB cube 10. A CHI representation is advantageous because the chroma C, hue H, and intensity I are uncorrelated within the unit cube for all intensities not exceeding unity. That is, any of the CHI coordinates can be changed without affecting the other coordinates, so long as the change does not cross the outer surface of the unit cube.

B. Transformation to CHI Color Space

A CHI color representation can be derived from the RGB cube 10 in several ways. One way in which a CHI color representation can be derived from the RGB cube 10 is by a double transformation. The first transformation is a rectangular-to-polar coordinate transformation that converts the RGB Cartesian coordinates to an intermediate polar representation 20 (FIG. 2), including polar coordinates analogous to latitude, longitude, and altitude above the origin.

Figure 2:
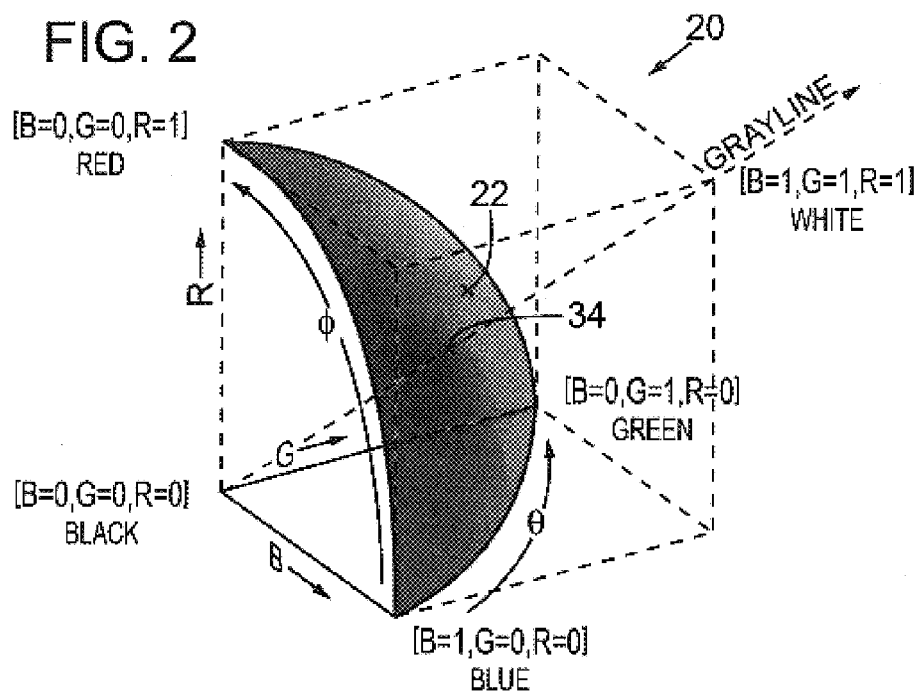
FIG. 2 is an isometric color representation of an intermediate polar form of the RGB cube of FIG. 1 showing a single surface within the RGB color cube of FIG. 1, defined by a unit intensity for all hues and chromas, according to an embodiment of the invention.

FIG. 2 shows an intermediate polar representation 20 in which a desired color point, such as a color point 22, is located by a latitudinal angle $\Phi$, a longitudinal angle $\theta$, and an altitude representing the intensity I of the color point 22. For example, assume that the intermediate polar representation 20 represents the earth, where latitude is referenced to the equator, and longitude is referenced to Greenwich, England. In FIG. 2, the longitude $\theta$ is referenced to the blue-red plane, and the latitude $\Phi$ is referenced to the blue-green plane. Analogous to Greenwich England is the color gray at point 34, which is located at $\theta=\pi/4$ and $\Phi=\sin^{-1}(1/\sqrt{3})$.

Figure 3A:
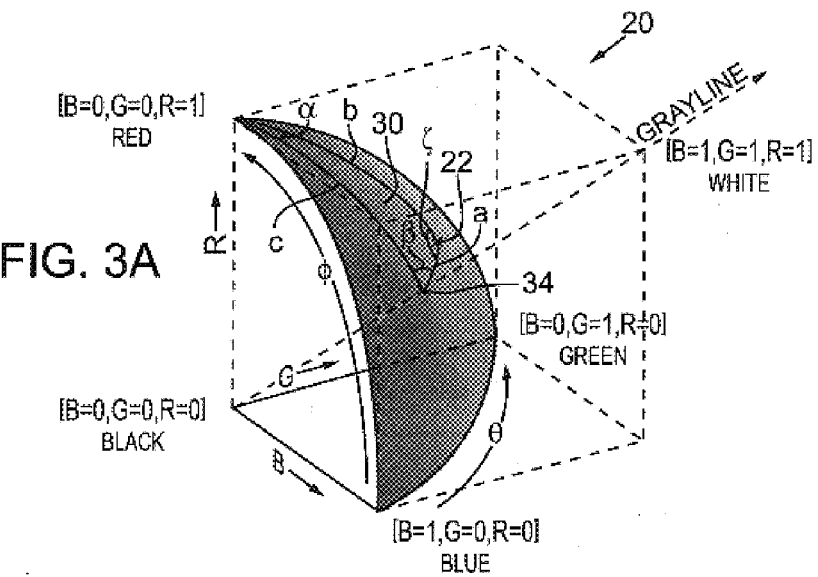
FIG. 3A is an isometric diagram illustrating a spherical triangle on the surface of FIG. 2.

The second transformation from the intermediate polar representation 20 to a CHI color space entails using Napier's rules, which are described by way of example with reference to FIGS. 3A and 3B. FIG. 3A shows a spherical triangle 30 on the surface of the same quarter hemisphere of FIG. 2. FIG. 3B shows the spherical triangle 30 apart from the rest of the quarter hemisphere (and from the opposite perspective, with the origin on the right). The vertices of a spherical triangle 30 are the unit red point 36, the unit gray point 34, and the arbitrary color point of interest 22. The angles of the spherical triangle 30 are $\alpha$, $\beta$, and $\zeta$, and the respective opposing sides of the spherical triangle 30 are noted by arc lengths a, b, and c. The CHI coordinates for the color point of interest 22 are a hue related to the angle $\beta$, a chroma given by the angle $\alpha$ (which is arc length a divided by unit intensity), and an intensity I, which is the same everywhere on the spherical triangle 30.

Returning to the earth analogy, all latitudes and longitudes can be described as a compass angle and a great circle distance from Greenwich, England. The compass angle is referenced to true north, and the great circle distance is described as either an arc length or an arc angle. Similarly, the second transformation describes the hue as the compass angle $\beta$ relative to the pure red point 36 (true north) and the chroma as the angular distance $\alpha$ of the point of interest 32 from the graypoint 34 (Greenwich, England).

Because Napier's rules, which are well-known to those in the art, relate a, b, c, $\alpha$, $\beta$, and $\zeta$ to each other, it is a simple matter to calculate a or $\alpha$ (chroma) and $\beta$ (hue) given the known variables, viz., the three vertices of the spherical triangle 30.

Figure 4A:
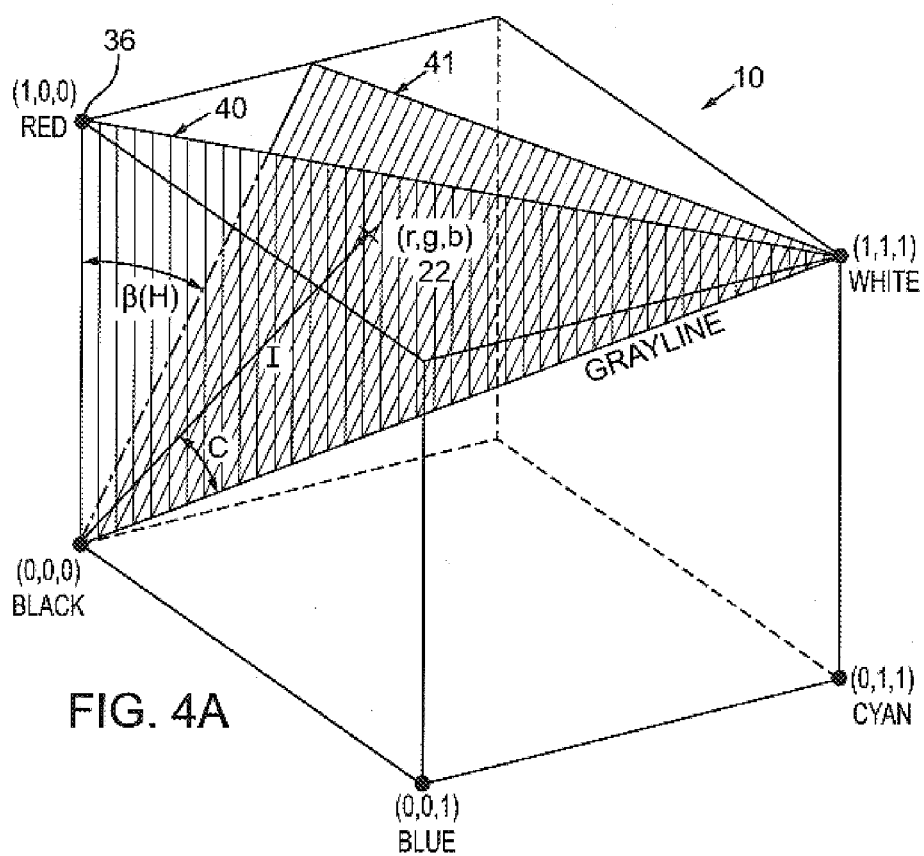
FIG. 4A is an isometric diagram illustrating coordinates of a CHI color space geometrically, according to one embodiment of the invention.

Before proceeding, it is instructive to introduce the notion of hue planes. A hue reference plane can be defined as a half plane with its edge along the grayline and containing the pure red point 36. With reference to FIG. 3B, the hue plane contains the origin, the gray point 34, and the pure red point 36. The point of interest 22 lies in another half-plane having its edge along the grayline. That plane is at angle $\beta$ from the reference hue plane and contains the origin, the graypoint 34, and the point of interest 22. Those planes are illustrated in FIG. 4A within the RGB cube 10. The hue reference plane is labeled 40, and the hue plane containing the point of interest 22 is labeled 41. It can be seen from FIG. 4A, that the CHI coordinates specify the color point of interest 22 in terms of its angle from the hue reference plane 40 (i.e., hue H), its angular displacement from the grayline (i.e., chroma C), and its distance from the origin (i.e., intensity I). FIG. 4A shows that every point in the color cube 10 can be uniquely described by a set of C, H, and I values. FIG. 4A also reinforces the meaning of the individual C, H, and I parameters. For example, hue H clearly signifies which primary color the point 22 best matches; while chroma C clearly indicates the degree of grayness.

FIG. 4B shows the hue reference plane 40 in color. Actually, FIG. 4B shows both the hue=0 half plane and the complementary half-plane corresponding to hue=$\pi$ (or 180°), which together are hereafter referred to jointly as the hue reference plane 40. The hue reference plane 40 contains the grayline, denoted 42, which includes all shades of gray from black to white, and a black/red edge 44 of the RGB cube 10. The hue reference plane 40 is a slice of the RGB cube 10 through the black [R=0, G=0, B=0], red [R=1, G=0, B=0], cyan [R=0, G=1, B=1], and white [R=1, G=1, B=1] vertices. The hue reference plane 40 contains all the chromas and intensities for the pure red hue and its complement pure cyan. The upper left half of the hue reference plane 40 above the grayline 42 contains all the chromas and intensities of the "pure red" hue (H=0), and the lower right half contains all the chromas and intensities of the "pure cyan" hue (H=180°).

The hue reference plane 40 has the additional attribute of containing all points in the RGB cube 10 (FIG. 1) for which the green and blue components are equal (G=B). Therefore, the hue reference plane 40 can be described by the equation B−G=0. Also, because the grayline 42 contains the colors black and white, it can be described in the RGB cube 10 by a "white" color vector $[1,1,1]^T$.

As pointed out above, all other hues are defined by the angle between the hue reference plane 40 and another plane containing the grayline 42. For any rotational angle referenced to zero (pure red/cyan), the resulting rotated full plane contains all the possible chromas and intensities for two complementary hues. All hues in the CHI representation are formed by variants of the hue reference plane 40 containing and rotated about the grayline 42. The hue angles H for the primary hues and their complements are shown in Table 1:

TABLE 1

| HUE | H |
| --- | --- |
| Red | 0 |
| Yellow | π/3 |
| Green | 2π/3 |
| Cyan | π |
| Blue | 4π/3 |
| Magenta | 5π/3 |

In a CHI representation, chroma C is defined by an angular measurement relative to the grayline 42. Contours of constant chroma 46 are represented as radial lines emanating from the black end of the grayline 42. Contours of constant intensity 48 are represented as arcs of constant radius from the black end of the grayline 42.

The RGB-to-CHI transformation described qualitatively above can be mathematically calculated in any number of ways. One illustrative mathematical technique is as follows. First, a simple rectangular-to-polar transformation as shown in FIG. 2 is performed. Given an arbitrary point in the RGB coordinate system having coordinates [r,g,b], that point is transformed to a longitudinal angle θ, latitudinal angle Φ, and intensity I by employing Equations 1:

$$I = \sqrt{r^2 + g^2 + b^2} \quad (1a)$$

$$\Theta = \sin^{-1}\left(\frac{g}{\sqrt{b^2+g^2}}\right) \quad (1b)$$

$$\Phi = \sin^{-1}\left(\frac{r}{I}\right) \quad (1c)$$

Intensities represented by the RGB cube 10 (FIG. 1) lie in the range between zero (black) and √3 (white). All shades of gray in Equations 1 are defined by r=g=b.

Referring to FIGS. 2 and 3, a second transformation employs Napier's Rules of spherical trigonometry to map the intermediate polar coordinates of Equations 1 to values of chroma C, hue H, and intensity I.

As an example, FIG. 3B example shows c as an arc length between the pure red point 36 of intensity I ([R=I,G=0, B=0] such that [θ=π/4, ϕ=π/2, I]) and the gray point 34 of intensity I [R=G=B=I/√3] such that [θ=π/4,ϕ=sin⁻¹(1/√3),I] where 0≦I≦1. The color of interest 22 is shown as green at the vertex of interior angle ζ. In the CHI representation coordinate system, chroma C corresponds to the angle associated with the arc length a or the corresponding angle α (a=α when I=1), hue H corresponds to the angle β, and intensity corresponds to I. This CHI representation calculates hue and chroma for a fixed, unit intensity, regardless of what the actual intensity is. If I is not unity, hue and chroma would not remain constant for constant RGB ratios owing to the nature of Napier's Rules.

Geometry formulae (e.g., direction cosines) can be used to derive the equation of an arbitrary plane containing "white" and an arbitrary RGB color $[r,g,b]^T$. In the hue reference plane 40, intensity I is expressed in Equation 1a. Consequently, the angle β between the hue reference plane 40 and the arbitrary plane equals the angle between their norms:

$$\beta = \cos^{-1}\left(\frac{2r - g - b}{2\sqrt{I^2 - rg - rb - bg}}\right), \quad (2)$$

and the hue H is expressed as:

$$H = \begin{cases} \beta, & g > b \\ 2\pi - \beta, & \text{otherwise.} \end{cases} \quad (3)$$

The chroma C is the angle between the RGB vector for the arbitrary color $[r,g,b]^T$ and the RGB vector for the grayline $[1,1,1,]^T$:

$$C = \cos^{-1}\left(\frac{r + g + b}{\sqrt{3} \cdot I}\right), \quad (4)$$

where intensity I is expressed as in Equation 1a. Because the planar geometry equations for hue and chroma are substantially simpler than their spherical geometry counterparts, the RGB-to-CHI transform is preferably implemented in software based on Equations 2, 3, and 4. The processing speed and memory bandwidth of modern computing systems allow the RGB-to-CHI transformation (and its inverse) to be implemented efficiently. Implementation can be via direct computation of the CHI parameters using Equations 2-4, or their equivalent. Alternatively, the RGB-to-CHI transformation (and its inverse) can be implemented approximately with an efficient, low-distortion table lookup. The latter implementation is preferable for the chroma (C) and hue (H) terms, which involve computationally intensive trigonometric functions.

Although the preceding description specifically explains the details of a conversion to CHI coordinates from RGB coordinates, it should be clear that the CHI coordinates can be derived from any initial coordinate system. For example, the choice of RGB coordinates is arbitrary. Any color in the RGB cube could be specified in terms of yellow, magenta, and cyan coordinates, for example. Indeed, the following RGB-to-CHI transformation can be generalized to map from any three-primary-color space to a CHI color space, as one skilled in the art will readily realize. More generally, a transformation of a three-primary color space to a CHI color space is typically an invertible, isomorphic transformation.

CHI "false-color" spaces can also be derived from color spaces with more than three primary "colors." A false-color space is a technique for visualizing data measured at least partially outside of the visible spectrum by mapping those measurements to the visible spectrum. A false-color space may be based on more than three measurement frequency bands of the electromagnetic spectrum ("EMS"), in which case the conversion to a CHI color space is a non-invertible transformation. That "hyperspectral" generalization of the RGB-to-CHI transformation is described mathematically below. It allows a hyperspectral color space to be described in terms of the three CHI coordinates. It also allows a false-color RGB representation to be created by inverse-transforming the CHI representation derived from the original hyperspectral representation. Unfortunately, neither the apparatus of three-dimensional geometry nor the spherical geometry (Napier's rules) used above to describe CHI in the context of a three-primary color space apply to hyperspectral scenarios; nonetheless, the vector mathematics described below applies to embodiments in any arbitrary number of dimensions in any part of the EMS.

For an (N>3)-dimensional hyperspectral color space, Equation 1a for intensity is generalized to the Euclidean norm of the space's N primary energies. Equation 2 for $\beta$ is generalized to the angle between the hue reference hyperplane (which, by convention and without loss of generality, we associate with the longest-wavelength hyperspectral primary and the black-to-white diagonal of the unit N-dimensional hypercube) and the arbitrary hue plane. If we denote the normal vectors for these reference and arbitrary color planes as $N_R$ and $N_C$, respectively, the expression for $\beta$ generalizes to $$\beta = \cos^{-1}\left(\frac{N_R \cdot N_C}{|N_R||N_C|}\right) \quad (5)$$

where the notation |x| denotes the Euclidean norm of x. The hue expression associated with this generalized expression for $\beta$ is (by convention and without loss of generality) given by $$H = \begin{cases} \beta, & \text{if mid-freq. energy > high-freq. energy} \\ 2\pi - \beta, & \text{otherwise.} \end{cases} \quad (6)$$

The generalized chroma expression, given an arbitrary N-dimensional hyperspectral energy vector $$E = \begin{bmatrix} E_{f1} \\ E_{f2} \\ \cdot \\ \cdot \\ \cdot \\ E_{fN} \end{bmatrix}$$

is the arc cosine of a normalized ratio of E's $L_1$ and $L_2$ (Euclidean) norms (the latter of which is equivalent to the intensity parameter I):

$$C = \cos^{-1}\left(\frac{|E|_1}{\sqrt{N}|E|_2}\right) = \cos^{-1}\left(\frac{|E|_1}{\sqrt{N}I}\right) = \cos^{-1}\left(\frac{\sum_{j=1}^{N} E_{fj}}{\sqrt{N}I}\right) \quad (7)$$

where $$I = \sqrt{\sum_{j=1}^{N} E_{fj}^2}. \quad (8)$$

C. Inverse CHI-to-RGB Transformation

The inverse CHI-to-RGB transform essentially reverses the previous calculations. From the spherical geometry formulation, $\beta$ is obtained from H as follows:

$$\beta = \begin{cases} H, & H \leq \pi \\ 2\pi - H, & \text{otherwise} \end{cases} \quad (9)$$

The RGB coordinates are obtained from the intermediate polar coordinates as follows in Equation 6:

$$r = I \cdot \sin(\phi) \quad (10a)$$

$$g = I \cdot \cos(\phi) \cdot \sin(\theta) \quad (10b)$$

$$b = I \cdot \cos(\phi) \cdot \cos(\theta) \quad (10c)$$

Equations 9 and 10 describing the inverse CHI transformation assume that the values of hue, chroma, and intensity are "legal" (i.e., they represent a color that falls within the bounds of the RGB cube 10). This assumption is not necessarily valid when colors are quantized in the CHI representation. Consequently, a CHI representation preferably includes a coordinate validation process that ensures generating only legal coordinates.

From Equation 4, the $L_1$ norm of a color can be expressed in RGB coordinates as follows:

$$\sigma = r + g + b = \cos(C) \cdot \sqrt{3} \cdot I \quad (11)$$

The RGB red coordinate can be expressed in terms of CHI coordinates using an intermediate term $\eta$:

$$\eta = \sqrt{6} \cdot I \cdot \cos(\beta) \cdot \sin(C) \quad (12)$$

Therefore, $$r = \frac{\sigma + \eta}{3}. \quad (13)$$

This allows deriving expressions for blue and green:

$$b = \frac{1}{2} \cdot \left[(\sigma - r) \pm \sqrt{2 \cdot I^2 - (\sigma - r)^2 - 2 \cdot r^2}\right]; \quad (14)$$

$$g = \sigma - r - b = \frac{1}{2} \cdot \left[(\sigma - r) \mp \sqrt{2 \cdot I^2 - (\sigma - r)^2 - 2 \cdot r^2}\right] \quad (15)$$

Note that the complementary ± terms for blue and green in Equations 14 and 15 are resolved by the hue. If $H > \pi$, the blue term is larger, otherwise, the green term is larger.

For hyperspectral color spaces, an RGB false-color image corresponding to the CHI transform of the original N-dimensional color space can be generated using Equations 11-15. If the conventions of the forward hyperspectral-to-CHI transform are followed, the resulting false color image will, in effect, map the original hyperspectrum to the visible color spectrum. Therefore, long-wavelength energies will be represented by red, medium-wavelength energies will be represented by green, and short-wavelength energies will be represented by blue.

The RGB-to-CHI transform and its inverse are computationally complex due to the transcendental functions that must be evaluated. However, because the intensity component of the CHI representation can be computed directly with only three multiplications and two additions per pixel, a transform lookup table can be created to determine the color (C,H) coordinates, given the original RGB coordinates. There are some non-trivial considerations for table lookup of the inverse transform (CHI-to-RGB) when machine vision and/or computational learning affects the CHI representation. Specifically, inverse transformation of illegal chroma values should not be allowed because such inverse-transformed values would generate illegal RGB values outside the unit RGB cube 10. Since constraints on chroma are a function of both hue and intensity, legal chroma values are of a size that prevents the lookup tables from being too large.

FIGS. 5A, 5B, 5C, 5D, 5E, 5F, 5G, 5H, and 5J show quarter-hemispherical slices of the CHI representation, corresponding to all allowable hue and chroma values for nine intensities ranging from I=0.2 (FIG. 5A) to I=1.6 (FIG. 5J) respectively. Each figure represents a quarter-hemispherical surface of constant intensity taken from inside the RGB cube 10 of FIG. 1, which shows several contours of constant intensity outlined on its outer surfaces.

These figures illustrate some interesting characteristics about the CHI representation. Most obvious is how the allowable values shrink for intensities greater than one. The set of allowable chroma values shrinks as intensity increases from unity to its maximum value of $\sqrt{3}$, because the outer vertices of the CHI polar representation of FIG. 2 fall outside the RGB cube 10 of FIG. 1 wherever I>1. Simply put, all hues exist for all intensities, but the upper bound on chroma decreases to zero as intensity increases from unity to $\sqrt{3}$.

Therefore, there is a correlation between the hue and intensity of a color of interest, on one hand, and the set of chromas it can have, on the other hand. For example, certain colors, such as yellow, exist only for large intensities and high chromas, whereas colors such as olive, which has the same hue as yellow, exists only for low intensities. Likewise, high-intensity colors with hues between cyan, magenta, and yellow simply cannot have high chromas.

Figure 5G:
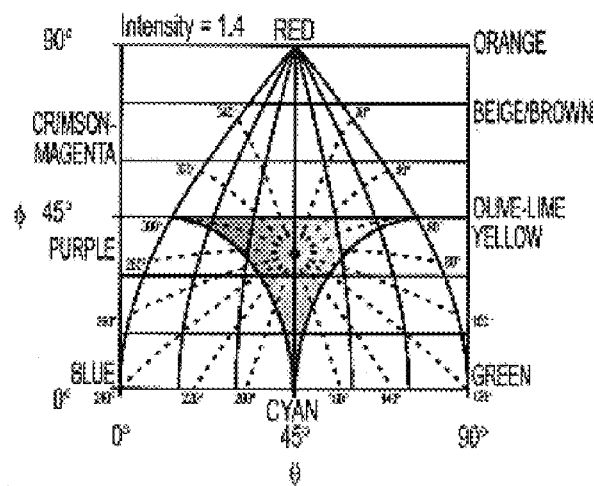
Figure 5H:
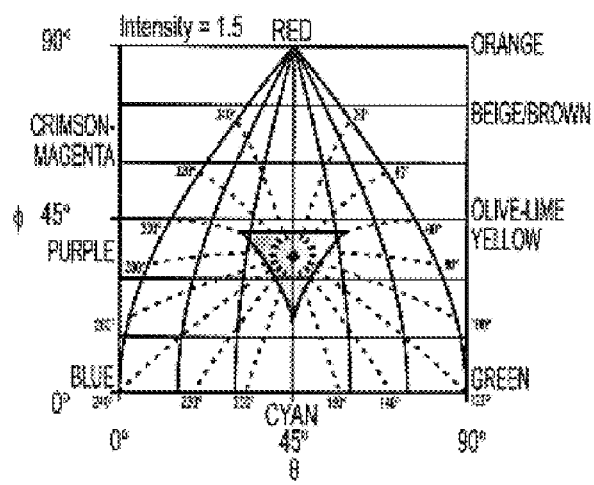
Figure 5J:
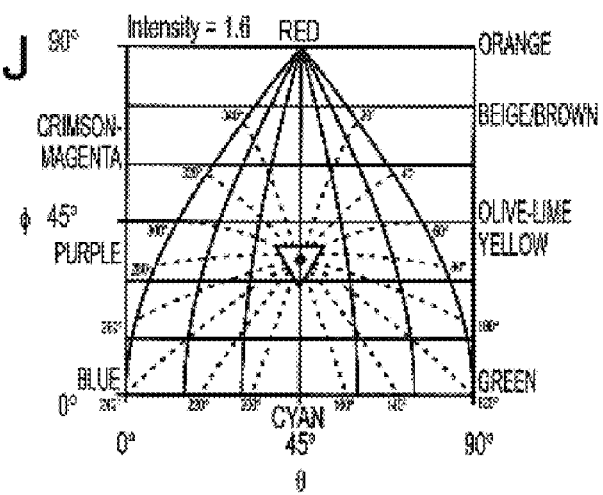

FIGS. 5A, 5B, 5C, 5D, 5E, 5F, 5G, 5H, and 5J also show the strong inverse correlation between intensity and chroma for all intensities greater than unity, which inverse correlation can be exploited during lossy compression. Moreover, FIGS. 5A, 5B, and 5C show that the constraints on chroma are fixed for intensities less than or equal to unity.

Figure 6A:
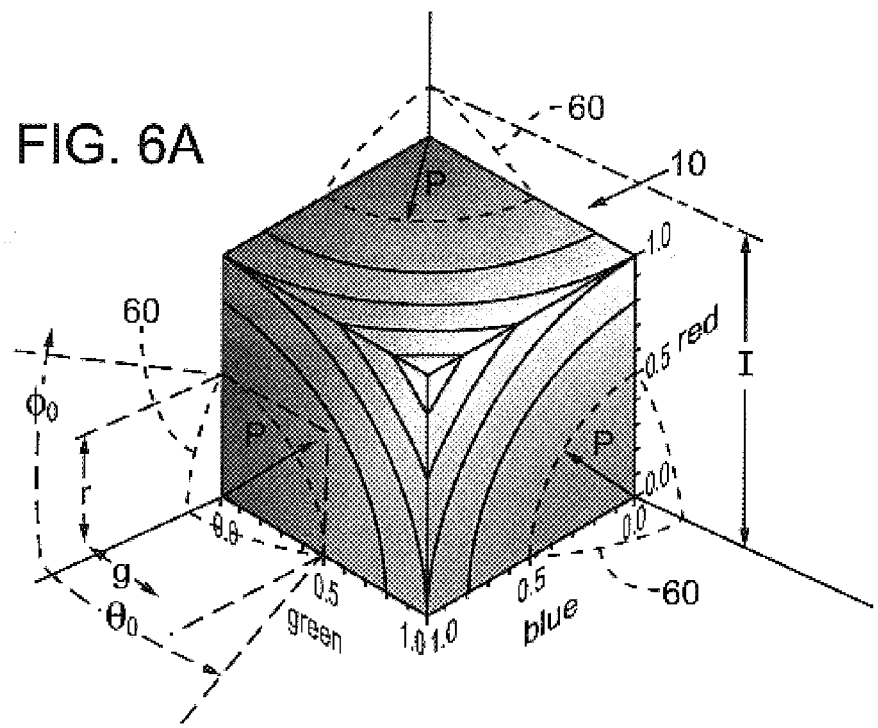
FIGS. 6A and 6B are color isometric views of the RGB cube of FIG. 1 showing, respectively, how a CHI representation polar quarter hemisphere violates its boundaries when the intensity I is between one and the square-root of two, and when the intensity I is between the square root of two and the square root of three, according to one embodiment of the invention.
Figure 6B:
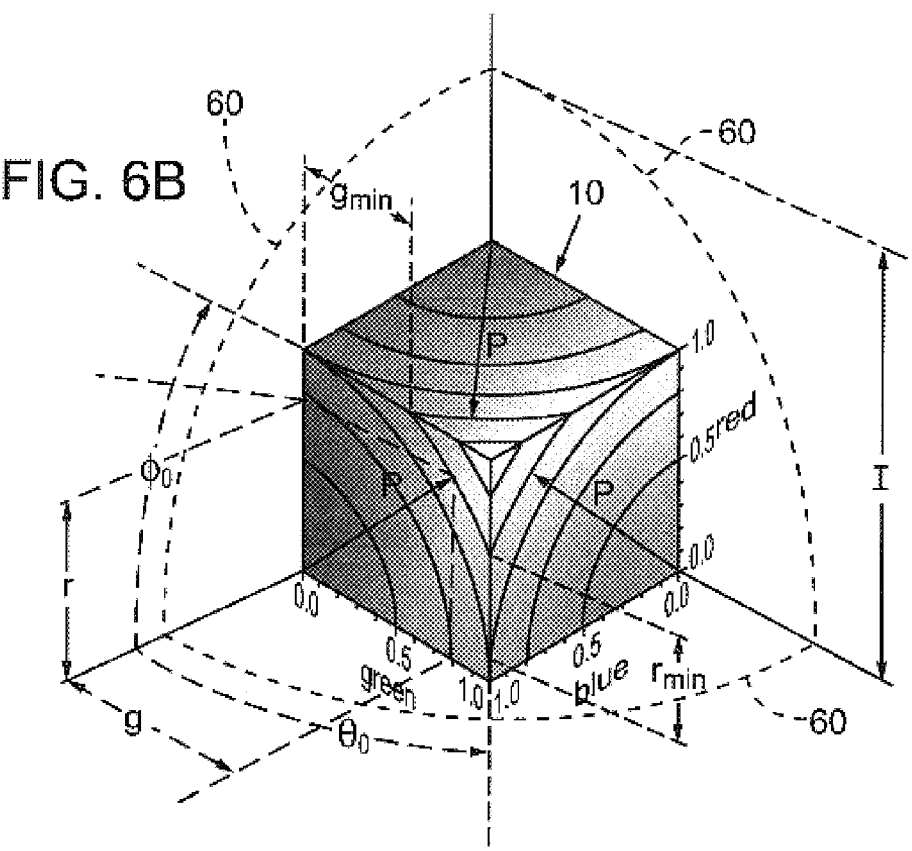

FIGS. 6A and 6B show what happens when intensity exceeds unity. The surface of a CHI representation quarter-hemisphere 60 (shown in dashed lines) represent all hues and chromas for the given intensity violates the bounds of the RGB cube 10. The dashed segments of the quarter-hemisphere 60 represent excessive chroma values that constitute non-existent colors. (FIGS. 5A, 5B, 5C, 5D, 5F, 5G, 5H, and 5J are orthographic projections of the "legal" portions of the CHI representation quarter-hemisphere 60.)

Accordingly, there are mathematical constraints imposed on chroma for all hue and intensity values. When I>1, the intersection of the CHI quarter-hemisphere 60 of radius I and RGB unit cube 10 results in three circular arcs of radius P on the outside faces of the cube. Consequently, there are tighter bounds on θ and Φ when I>1. The upper bound on Φ is the particular Φ for which the RGB red component is unity. The lower bound on Φ is zero, unless the intensity exceeds $\sqrt{2}$. In such cases the radius P exceeds unity, and the only legal colors are low chroma mixtures of cyan, magenta, and yellow, plus light gray through white. Also, the red-cyan hue reference plane 40 of FIG. 4B, corresponding to the longitudinal angle θ=π/4, defines the lower bound on the latitudinal angle Φ.

Determining the lower and upper bounds on the longitudinal angle θ entails determining whether the projection of the intensity I onto the blue-green plane results in a vector of length greater than one. FIGS. 6A and 6B show that the upper and lower bounds on legal values of θ depend on the latitudinal angle Φ, and graphically show the difficulty of expressing the maximum chroma by solving expressions defining the intersections of the RGB cube 10 and the CHI quarter-hemisphere 60. Clarification is provided by FIG. 4B, which shows the intersection as a parallelogram (the hue reference plane 40) in the chroma-intensity (CI) plane for each value of hue H.

Figure 7A:
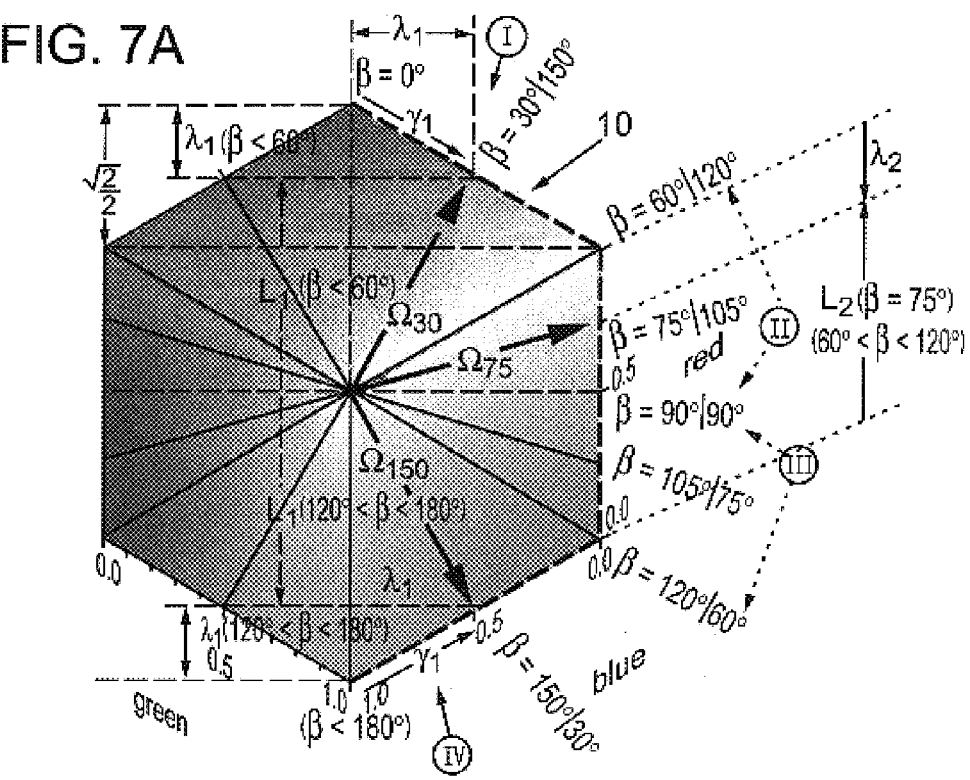
FIGS. 7A and 7B are respective color isometric and orthographic views for constructing CHI chroma-intensity planes for any given hue expressed by a hue angle β and its complement, according to one embodiment of the invention.
Figure 7B:
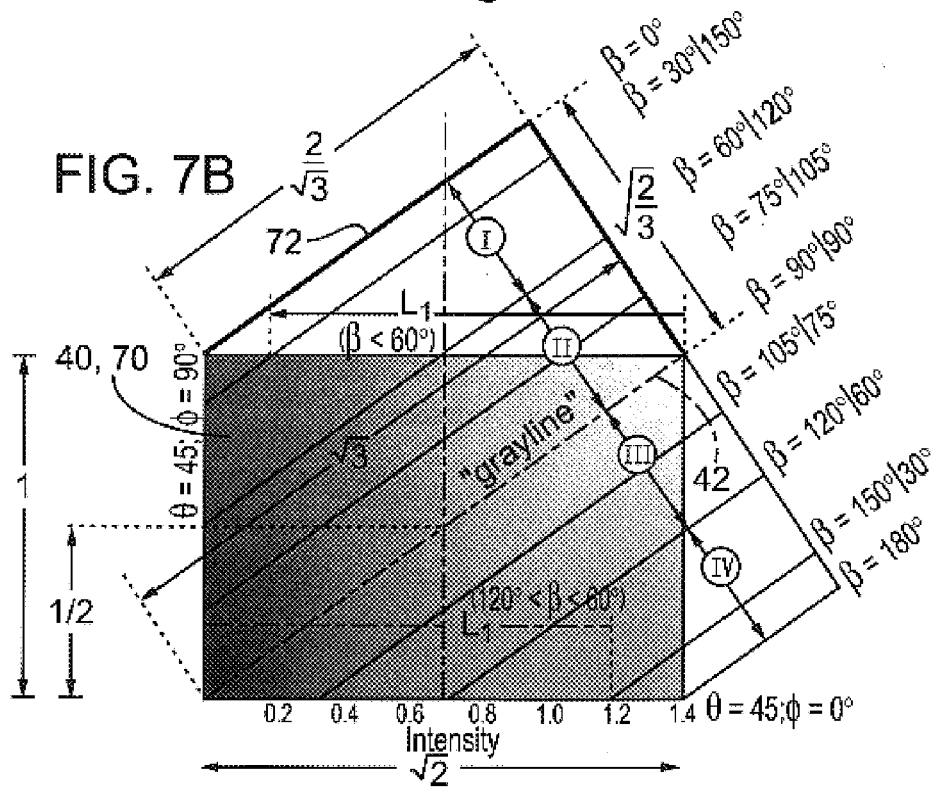

FIGS. 7A and 7B elaborate on FIG. 4B and assist in describing the trigonometry that determines the bounding values of chroma for given values of hue and intensity.

FIG. 7A shows the RGB cube 10, viewed straight down the grayline 42 (shown in FIG. 7B) from the white vertex towards the hidden black vertex. Because hue, chroma, and intensity are uncorrelated for all intensities not exceeding unity, a particular value of hue has a related angle β and defines a plane in the RGB cube 10 that always contains the grayline 42. FIG. 7A shows the intersections of various chroma-intensity planes with the faces of the RGB cube 10 for several corresponding hue angles and their complements: β=0|180, 30|150, 60|120, 75|105, 90|90, 105|75, 120|60, and 150|30 degrees.

FIG. 7B shows a particular chroma-intensity plane 70 defined for β=0°|180° and rotated for viewing as a vertical cross-section of the RGB cube 10 rather than a vertical edge. Note that this plane corresponds to the hue reference plane 40 of FIG. 4B when β=0°|180°. Several measurements shown in FIG. 7A are projected onto FIG. 7B to assist in graphically expressing the bounds on chroma for particular values of hue and intensity.

As the hue angle β increases from zero to 180 degrees, its complement decreases from 180 to zero degrees. The associated bounds on the chroma-intensity plane 70 change for each hue and its complement. Moreover, as the hue angle β increases from zero to 180 degrees, the chroma-intensity plane 70 changes from a rectangle to a parallelogram. The chroma bounds with respect to β equate to the changing edge lengths of the parallelogram-shaped chroma-intensity plane 70. The bounds change through four phases denoted I, II, III, and IV and corresponding to four ranges of angle β: $\beta \leq 60°$, $60° < \beta \leq 90°$, $90° < \beta \leq 120°$, and $120° < \beta \leq 180°$.

Recall that the chroma-intensity plane 70 rotates about the grayline 42 as the hue angle β changes. To determine the chroma bounds, a right triangle 72 is constructed atop the chroma-intensity plane 70 in phases I and II and below the chroma-intensity plane 70 in phases III and IV (To reduce drawing complexity, the triangle 72 is not shown for phases III and IV). The triangle 72 has a hypotenuse represented by a variable length $L_1$ and a side represented by a variable length $L_2$. The lengths $L_1$ and $L_2$ are used in the following chroma bounding determinations.

Figure 8:
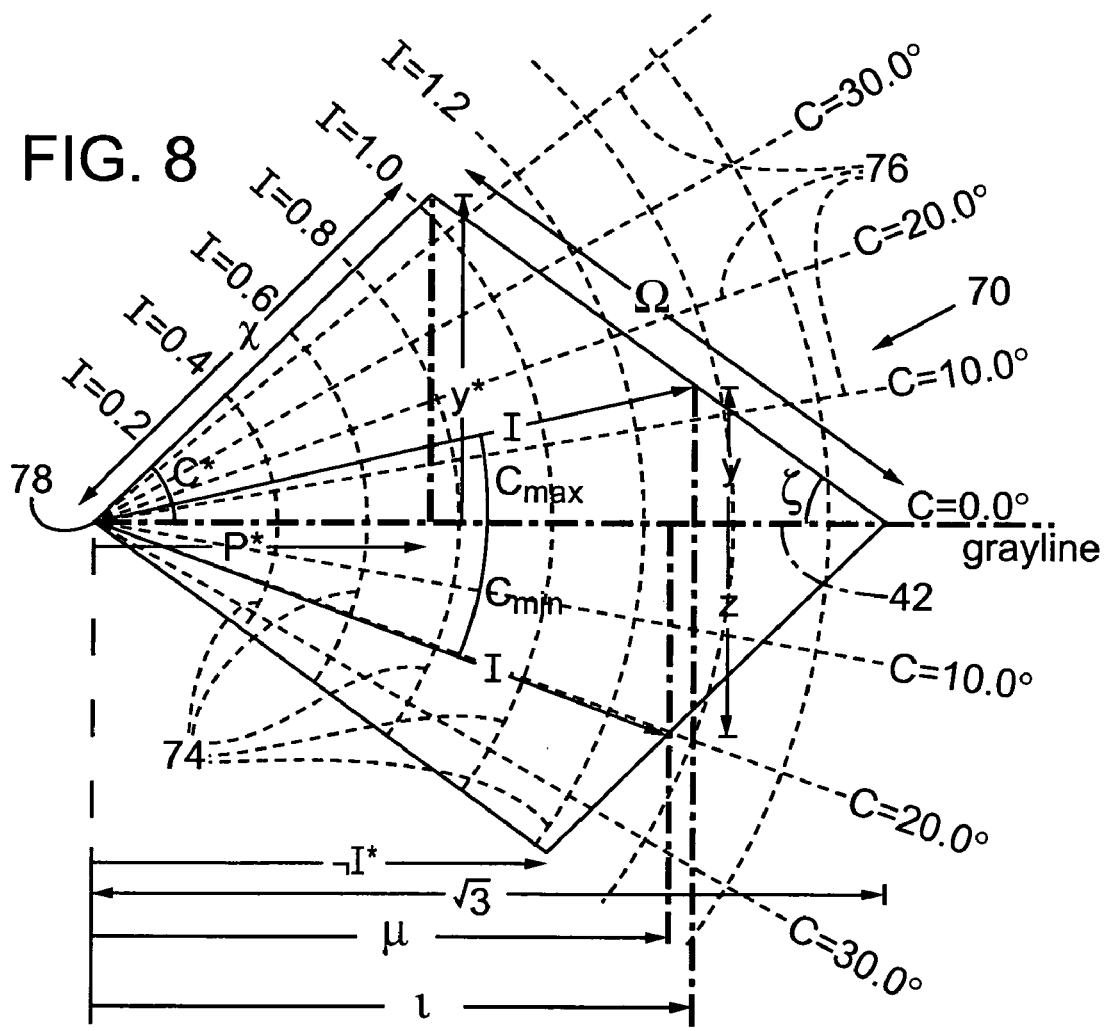
FIG. 8 is a graphical representation of the CHI chroma-intensity planes of FIGS. 7A and 7B showing the fundamental geometric relationships among its elements, according to one embodiment of the invention.

FIG. 8 shows the fundamental geometry of the chroma-intensity plane 70 as it rotates about the grayline 42, thereby generating a bounding parallelogram having varying side lengths $\chi$ and $\Omega$ where it intersects with the RGB cube 10 of FIG. 7A. The bounds on chroma C for a given intensity I are defined by the side lengths of the parallelogram. Contours of constant intensity 74 are shown as annular arcs, and contours of constant chroma 76 are shown as radial lines emanating from a vertex 78 at the zero intensity (black) end of the grayline 42.

In phases I and IV, lengths $\chi$ and $\Omega$ depend on $\lambda_1$, $\gamma_1$, and $L_1$, which are shown in FIG. 7A. Using FIGS. 7A and 7B as a frame of reference, the lengths are expressed as follows:

$$\gamma_1 = \sqrt{2} \cdot \lambda_1 = \begin{cases} \frac{1}{2} - \sin\left(\frac{\pi}{6} - \beta\right), & \beta \le \frac{\pi}{3} (60°: \text{Phase I}) \\ \frac{1}{2} + \sin\left(\frac{5\pi}{6} - \beta\right), & \beta \ge \frac{2\pi}{3} (120°: \text{Phase IV}) \end{cases} \quad (16)$$

$$L_1 = \sqrt{2} - \frac{\gamma_1}{\sqrt{2}} = \sqrt{2} - \lambda_1 \quad (17)$$

$$X = \begin{cases} \sqrt{1 + \gamma_1^2}, & \beta \le \frac{\pi}{3} (60°: \text{Phase I}) \\ \sqrt{L_1^2 + \lambda_1^2}, & \beta \ge \frac{2\pi}{3} (120°: \text{Phase IV}) \end{cases} \quad (18)$$

$$\Omega = \begin{cases} \sqrt{L_1^2 + \lambda_1^2}, & \beta \le \frac{\pi}{3} (60°: \text{Phase I}) \\ \sqrt{1 + \gamma_1^2}, & \beta \ge \frac{2\pi}{3} (120°: \text{Phase IV}) \end{cases} \quad (19)$$

In phases II and III, the lengths $\chi$ and $\Omega$ depend on $\lambda_2$ and $L_2$, which are shown in FIG. 7A. Again, using FIGS. 7A and 7B as a frame of reference, the lengths are expressed as follows:

$$\lambda_2 = \frac{1}{2} - \sin\left(\frac{\pi}{2} - \beta\right) \quad (20)$$

$$L_2 = 1 - \lambda_2 \quad (21)$$

$$\begin{aligned} X &= \sqrt{1 + L_2^2} \\ \Omega &= \sqrt{1 + \lambda_2^2} \end{aligned} ; \frac{\pi}{3}(60°) < \beta < \frac{2\pi}{3}(120°) \quad (22, 23)$$

Equations 5 and 16-23, and FIGS. 7A, 7B, and 8 show how the bounds on chroma can be determined for a given hue angle $\beta$ and an intensity I. The calculations depend on $\chi$ and $\Omega$, which are shown in FIG. 8. The minimum and maximum chroma values ($C_{min}$ and $C_{max}$, respectively) can be determined given the hue-intensity pair <H,I>. As FIG. 8 illustrates, for a particular hue, there are two delimiting values of intensity I* and ¬I* that characterize the chroma bounds. In all hue phases, ¬I* is the complement of I*.

$$\neg I^* = \sqrt{3} - I^* \quad (24)$$

There are three expressions for I*, corresponding to phase I, phases II and III, and phase IV. Their derivations rely on Equations 12 to 19 and the relationships among I*, $\chi$, $\Omega$, and $\gamma$* in FIG. 8. The three expressions for I* are as follows:

Phase I: $I^* = \dfrac{X^2 - \Omega^2 + 3}{2 \cdot \sqrt{3}} = \dfrac{1 + \gamma_1^2 - L_1 - \lambda_2^2 + 3}{2 \cdot \sqrt{3}} = \dfrac{1 + \gamma_1}{\sqrt{3}};$ (25)

Phase II and III:

$$I^* = \frac{X^2 - \Omega^2 + 3}{2 \cdot \sqrt{3}} = \frac{1 + L_2^2 - 1 - \lambda_2^2 + 3}{2 \cdot \sqrt{3}} = \frac{2 - \lambda_2}{\sqrt{3}}; \quad (26)$$

Phase IV: $I^* = \dfrac{X^2 - \Omega^2 + 3}{2 \cdot \sqrt{3}} = \dfrac{L_1^2 + \lambda_1^2 - 1 - \gamma_1^2 + 3}{2 \cdot \sqrt{3}} = \dfrac{2 - \gamma_1}{\sqrt{3}}.$ (27)

For all intensities less than I*, $C_{max}$ is a constant C*. For intensities greater than I*, $C_{max}$ decreases non-linearly with intensity. Conversely, for all intensities less than ¬I*, $C_{min}$ (the maximum chroma for the complementary hue) is a constant $\zeta$. For intensities above ¬I*, it decreases nonlinearly with intensity. These relationships are represented in FIG. 8. The bounding angles C* and $\zeta$ are determined from the following equations:

$$C^* = \cos^{-1}\left(\frac{I^*}{X}\right) \quad (28a)$$

$$\zeta = \cos^{-1}\left(\frac{\neg I^*}{\Omega}\right) \quad (28b)$$

The chroma bounds are determined from the following equations:

$$C_{max} = \begin{cases} C^*, & I \le X \\ \cos^{-1}\left(\frac{l}{I}\right), & \text{otherwise} \end{cases} \quad (29a)$$

$$C_{min} = \begin{cases} \zeta, & I \le \Omega \\ \cos^{-1}\left(\frac{\mu}{I}\right), & \text{otherwise} \end{cases} \quad (29b)$$

FIG. 8 shows the geometric relationships for deriving l and $\mu$ in Equations 29. The derivations for l and $\mu$ are the same except for the angle involved ($\zeta$ is used to derive l; C* is used to derive $\mu$):

$$l = \frac{B + \sqrt{B^2 - 4AG}}{2A} \quad (30a)$$

where $$A = 1 + \alpha; B = 2\alpha\sqrt{3}; G = 3\alpha - I^2; \alpha = \tan^2(\zeta). \quad (30b)$$

The equations for $\mu$ are identical to those for l in Equations 30a and 30b except for the definition of $\alpha$:

$$\alpha = \tan^2(C^*). \quad (31)$$

D. Properties of CHI Color Representations

Referring again to FIG. 4B, it is instructive to observe how changing chroma affects the appearance of a color along a contour of constant intensity 48. There is a subtle fade to gray that occurs as chroma approaches zero while intensity remains constant. There is also a true consistency of hue in the CHI representation. The rich palette of colors stem from only two hues: red and cyan. Three additional, subjective phenomena are apparent: (1) hue is the defining attribute of color; (2) for intensities below 0.2, all colors appear dark gray or black, regardless of chroma, and (3) colors with the same hue having intermediate values of intensity and chroma appear remarkably similar.

The above-described phenomena are useful for developing lossy compression processes because substantial quantizations of hue, chroma, and intensity are substantially undetectable to the human eye if hue is maintained in the quantization process.

A CHI representation is useful for the efficient and accurate representation, communication, and storage of color data in processing-based applications, such as machine vision applications.

It can be shown mathematically that the CHI and RGB representations have an identical PSNR, which, as already mentioned, is a common distortion measure for assessing the performance of lossy image/video data compression algorithms. However, the expression for the CHI PSNR can be decomposed into a pure intensity term and an intensity-weighted color term. Minimizing pure intensity and pure chromatic distortions separately minimizes the overall distortion. Equivalently, minimizing intensity and chromatic distortions maximizes the overall PSNR of the CHI representation.

The CHI PSNR decomposition implies that images expressed in CHI coordinates can be quantized by separately quantizing their intensity and color (C,H) components. These two quantizations can be performed independently and in parallel, yet the aggregate PSNR will not deviate substantially from the PSNR of a joint quantization. The separate quantization is beneficial for machine vision applications and minimally lossy image compression.

The CHI representation is advantageous because it minimizes the mutual information INFO(<C,H>;I) between the chroma-and-hue <C,H> of an image and its intensity. In fact, when an image is represented in CHI coordinates, it is provable that both mutual information terms INFO(<C,H>; I) and INFO(I;<C;H>) are zero for all $I \leq 1$. Moreover, they are minimal for $1 < I \leq \sqrt{3}$.

An analysis of $PSNR_{CHI}$ and ENT(<C,H>;I) (where ENT denotes entropy as understood in the field of information theory) allows formulating a minimally lossy coding strategy that is matched to the bandwidth of a transmission channel and dynamic range of an image display. It also allows formulating a fast, optimal search strategy for color matching.

As described in the background section, modern CRT and LCD displays have typical intensity ranges of between 100:1 and 400:1, corresponding to dynamic ranges on the order of 40 dB to 52 dB, which require between 6.64 bits and 8.64 bits to represent faithfully. Yet, a 24-bit RGB image corresponds to a dynamic range of approximately 129 dB. No current display technology can render half that dynamic range, but because the RGB representation is inefficient, the entire dynamic range is needed to render a rich color palette.

By employing a 24-bit CHI representation, the best displays require fewer than nine bits for rendering a full dynamic intensity range, leaving 15 bits for color representation. Fifteen bits support 32,768 unique colors for each intensity, far out-stripping the number of colors the display can render. Therefore, a reduced number of bits can be used for encoding color to match the display rendering capability. Even assuming an ideal display, the maximum number of bits required is about 18 bits, rather than 24 bits, yielding a 25% efficiency gain without any perceptible loss in image fidelity.

Accordingly, a CHI representation is advantageous for efficiently transmitting, storing, and processing imagery data, which is convertible to RGB image data for rendering on a display device.

A CHI representation is also advantageous because it allows representing color imagery by encoding intensity and chromatic information separately and in parallel, with PSNR substantially the same as optimal ones obtained by coding intensity and chromatic information jointly.

The same advantages hold true for searching a set of reference colors for a minimum distortion match to a single unknown color, which is useful in color machine vision. Accordingly, a CHI representation is further advantageous because it allows formulating a very fast sequential search that yields color matching results that are very close to those generated by a more computationally intensive optimal search.

The methods and systems illustrated and described herein can exist in a variety of forms both active and inactive. For example, they can exist as one or more software programs comprised of program instructions in source code, object code, executable code or other formats. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer readable signals, whether modulated using a carrier or not, are signals that a computer system hosting or running a computer program can be configured to access, including signals downloaded through the Internet or other networks. Concrete examples of the foregoing include distribution of software on a CD ROM or via Internet download. In a sense, the Internet itself, as an abstract entity, is a computer readable medium. The same is true of computer networks in general.

The terms and descriptions used herein are set forth by way of illustration only and are not meant as limitations. Those skilled in the art will recognize that many variations can be made to the details of the above-described embodiments without departing from the underlying principles of the invention. For example, the invention includes spherical and planar embodiments that can be implemented with different degrees of quantization, and can employ direct computation or table lookup. Also, the hue-reference plane 40 can be other than the plane containing pure red and pure cyan. The scope of the invention should, therefore, be determined only by the following claims, and their equivalents, in which all terms are to be understood in their broadest reasonable sense unless otherwise indicated.

The invention claimed is:

1. A machine vision method comprising:
sensing light energy associated with a scene, wherein the sensing step comprises measuring three primary color values, wherein the three primary color values are red, green, and blue, wherein the red value is denoted r, the green value denoted g, and the blue value denoted b;
generating color image data representing at least a portion of the scene, wherein the data are arranged as pixels, and the data for a given pixel comprise an intensity value, a hue value, and a chroma value, the intensity value representing the total sensed light energy associated with the pixel, the hue value representing a dominant or average frequency of the light energy associated with the pixel, and the chroma value representing a measure of the light energy on a side of the visible spectrum complementary to the hue, wherein the generating step comprises converting the three primary color values for the given pixel to a set of values comprising the chroma value, the hue value, and the intensity value, and the converting step comprises determining the intensity value (I) in at least approximate accordance with the relation: $I=\sqrt{r^2+g^2+b^2}$; and rendering said color image data, wherein the converting step further comprises:

determining a quantity ($\beta$) in at least approximate accordance with the relation:

$$\beta = \cos^{-1}\left(\frac{2r-g-b}{2\sqrt{I^2-rg-rb-bg}}\right); \text{ and}$$

determining the hue value (H) in at least approximate accordance with the relation:

$$H = \begin{cases} \beta, & g > b \\ 2\pi - \beta, & \text{otherwise.} \end{cases}$$

2. The method of claim 1, wherein the light energy associated with the scene comprises reflections of light from an illumination source at an illumination level, whereby the hue value is substantially invariant to changes in the illumination level.

3. The method of claim 1, wherein the light energy associated with the scene comprises reflections of light from an illumination source having an illumination color, whereby the hue value is, but for a correction factor, the same as under white illumination.

4. The method of claim 1, whereby the hue and intensity values are substantially invariant to changes of each other.

5. The method of claim 1, wherein one or more of the determining steps is accomplished by table look-up.

6. The method of claim 1, wherein the converting step further comprises:

determining the chroma value (C) in at least approximate accordance with the relation:

$$C = \cos^{-1}\left(\frac{r+g+b}{\sqrt{3} \cdot I}\right).$$

7. The method of claim 6, wherein one or more of the determining steps is accomplished by table look-up.

8. The method of claim 1 further comprising:
processing the generated color image data.

9. The method of claim 8 further comprising:
after the processing step, converting the chroma, hue, and intensity values to red, green, and blue values.

10. The method of claim 9, wherein the converting step comprises:

determining quantities $\beta$, $\sigma$, and $\eta$ in at least approximate accordance with the relations:

$$\beta = \begin{cases} H, & H \leq \pi \\ 2\pi - H, & \text{otherwise,} \end{cases}$$

$\sigma = \cos(C) \cdot \sqrt{3} \cdot I$, and $\eta = \sqrt{6} \cdot I \cdot \cos(\beta) \cdot \sin(C)$;

determining the red value (r) in at least approximate accordance with the relation:

$$r = \frac{\sigma + \eta}{3};$$

determining the blue value (b) in at least approximate accordance with the relation:

$$b = \frac{1}{2} \cdot \left[(\sigma - r) \pm \sqrt{2 \cdot I^2 - (\sigma - r)^2 - 2 \cdot r^2}\right]; \text{ and}$$

determining the green value (q) in at least approximate accordance with one or more of the relations:

$$g = \sigma - r - b = \frac{1}{2} \cdot \left[(\sigma - r) \mp \sqrt{2 \cdot I^2 - (\sigma - r)^2 - 2 \cdot r^2}\right].$$

11. The method of claim 10 further comprising:
determining whether to add or subtract the square root in the relation defining the blue value and the green value, based on the hue value.

12. The method of claim 10, wherein one or more of the determining steps is accomplished by table look-up.

13. The method of claim 10 further comprising:
determining whether the chroma value is legal; and
based on the determining step, conditionally performing the converting step.

14. A method comprising:
sensing electromagnetic energy associated with a source over an area in N frequency bands, wherein N>1;
generating color image data representing at least a portion of the area, wherein the data are arranged as pixels, and the color data for a given pixel comprise an intensity value, a hue value, and a chroma value, wherein the N frequency bands constitute a mathematical basis in N-dimensional space; wherein one of the N frequency bands establishes a first reference vector in the space, and equal parts of all N frequency bands establish a second reference vector in the space; wherein a plane containing the first reference vector and the second reference vector establish a reference plane in the space; wherein the data for the given pixel corresponds to a point in the N-dimensional space, such that the point corresponding to the data for the given pixel and the second reference vector define a plane of interest, such that the hue value is an angle between the reference plane and the plane of interest, and the chroma value is an angle subtended in the plane of interest between the point corresponding to the data for the given pixel and the second reference vector, and the intensity value is a Euclidean norm of the point corresponding to the data for the given pixel in the space; and
rendering an image based on said color image data.

15. The method of claim 14, wherein N=3.

16. The method of claim 15, wherein the three frequency bands lie at least substantially in the visible spectrum and correspond to the primary colors red, green, and blue.

17. The method of claim 16, wherein the red frequency band establishes the first reference vector.

18. The method of claim 15 further comprising:
processing the generated color image data.

19. The method of claim 18, wherein the processing step comprises:
compressing the generated color image data.

20. The method of claim 14, wherein the source produces electromagnetic energy by reflection of electromagnetic radiation from a separate radiation source, the radiation source having a radiation level, whereby the hue value is substantially invariant to changes in the radiation level.

21. The method of claim 14, wherein the source produces electromagnetic energy by reflection of electromagnetic radiation from a separate radiation source having a dominant radiation frequency, whereby the hue value is, but for a correction factor, the same as under spectrally dispersed radiation.

22. The method of claim 14, whereby the hue and intensity values are substantially invariant to changes of each other.

23. The method of claim 14, further comprising:
performing the generating step for substantially all pixels constituting the color image data.

24. The method of claim 14, further comprising:
performing the generating step for substantially all pixels constituting a contiguous subset of the color image data.

25. The method of claim 14, wherein the generating step comprises:
computing a quantity ($\beta$) according to the formula:

$$\beta = \cos^{-1}\left(\frac{N_R \cdot N_C}{|N_R||N_C|}\right),$$

where $N_R$ is a normal vector to the reference plane, and $N_C$ is a normal vector to the plane of interest;
determining the hue value (H) according to the relation:

$$H = \begin{cases} \beta, & \text{if mid-frequency energy} > \text{high-frequency energy} \\ 2\pi - \beta, & \text{otherwise;} \end{cases}$$

determining the intensity value (I) according to the formula:

$$I = \sqrt{\sum_{j=1}^{N} E_{fj}^2},$$

wherein the electromagnetic energy sensed in the N frequency bands are denoted $E_{f1}, E_{f2}, \ldots, E_{fN}$, respectively; and
determining the chroma value (C) according to the formula:

$$C = \cos^{-1}\left(\frac{\sum_{j=1}^{N} E_{fj}}{\sqrt{N}\, I}\right).$$

26. The method of claim 25, wherein N=3.

27. The method of claim 26, wherein the three frequency bands correspond at least approximately to visible red, green, and blue.

28. A color image data processing method comprising:
obtaining color image data representing at least a portion of the area from which electromagnetic energy emanates in at least N frequency bands, wherein the data are arranged as pixels, and the color data for a given pixel comprise an intensity value, a hue value, and a chroma value, wherein the frequency bands constitute a mathematical basis in N-dimensional space; wherein one of the N frequency bands establishes a first reference vector in the space, and equal parts of all N frequency bands establish a second reference vector in the space; wherein a plane containing the first reference vector and the second reference vector establish a reference plane in the space; wherein the data for the given pixel corresponds to a point in the N-dimensional space, such that the point corresponding to the data for the given pixel and the second reference vector define a plane of interest, such that the hue value is an angle between the reference plane and the plane of interest, and the chroma value is an angle subtended in the plane of interest between the point corresponding to the data for the given pixel and the second reference vector, and the intensity value is a Euclidean norm of the point corresponding to the data for the given pixel in the space;
processing one or more of the chroma, hue, and intensity values; and
rendering an image based on said color image data.

29. The method of claim 28 wherein the processing step comprises:
compressing one or more of the chroma, hue, and intensity values, whereby the one or more compressed values can be stored, transmitted, or further processed more efficiently.

30. The method of claim 29 wherein the compressing step comprises:
quantizing the intensity value; and
quantizing the chroma and hue values.

31. The method of claim 30 wherein the two quantizing steps are performed independently of each other.

32. The method of claim 30 wherein the two quantizing steps are performed in parallel.

33. The method of claim 30 wherein the step of quantizing the intensity value results in a quantized intensity value having nine bits or less.

34. The method of claim 30 wherein the step of quantizing the chroma and hue values results in quantized chroma and hue values having a total of nine bits or less.

35. The method of claim 29 further comprising:
transmitting the compressed one or more of the chroma, hue, and intensity values.

36. The method of claim 29, further comprising:
storing the compressed one or more of the chroma, hue, and intensity values.

37. The method of claim 29, further comprising:
processing the compressed one or more of the chroma, hue, and intensity values.

38. The method of claim 28, wherein the obtaining step comprises:
sensing electromagnetic energy associated with a source over an area; and
generating the color image data on the basis of the results of the sensing step.

39. The method of claim 28, wherein the obtaining step comprises:
receiving a transmission comprising the color image data.

40. The method of claim 28, wherein the obtaining step comprises:
retrieving the color image data from a storage memory.

41. The method of claim 40, wherein N>3, the color image data represents a hyperspectral image, and the rendered color image data in the RGB format is a false color image.

42. The method of claim 28, wherein the processing step comprises converting the color image data to an RGB format, and the method further comprises:
rendering the color image data in the RGB format on a display.

43. A computer-readable medium on which is embedded computer software, the software performing a method for generating color image date representing at least a portion of an area from which electromagnetic energy emanates, the method comprising:
generating color image data representing at least a portion of the area, wherein the data are arranged as pixels, and the color data for a given pixel comprise an intensity value, a hue value, and a chroma value, wherein the N frequency bands constitute a mathematical basis in N-dimensional space; wherein one of the N frequency bands establishes a first reference vector in the space, and equal parts of all N frequency bands establish a second reference vector in the space; wherein a plane containing the first reference vector and the second reference vector establish a reference plane in the space; wherein the data for the given pixel corresponds to a point in the N-dimensional space, such that the point corresponding to the data for the given pixel and the second reference vector define a plane of interest, such that the hue value is an angle between the reference plane and the plane of interest, and the chroma value is an angle subtended in the plane of interest between the point corresponding to the data for the given pixel and the second reference vector, and the intensity value is a Euclidean norm of the point corresponding to the data for the given pixel in the space; and
rendering an image based on said color image data.

44. A machine vision method comprising:
sensing light energy associated with a scene;
generating color image data representing at least a portion of the scene, wherein the data are arranged as pixels, and the data for a given pixel comprise an intensity value, a hue value, and a chroma value, the intensity value representing the total sensed light energy associated with the pixel, the hue value representing a dominant or average frequency of the light energy associated with the pixel, and the chroma value representing a measure of the light energy on a side of the visible spectrum complementary to the hue
processing the generated color image data;
after the processing step, converting the chroma, hue, and intensity values to red, green, and blue values, wherein the converting step comprises:
determining quantities $\beta$, $\sigma$, and $\eta$ in at least approximate accordance with the relations:

$$\beta = \begin{cases} H, & H \leq \pi \\ 2\pi - H, & \text{otherwise,} \end{cases}$$

$\sigma = \cos(C) \cdot \sqrt{3} \cdot I$, and $\eta = \sqrt{6} \cdot I \cdot \cos(\beta) \cdot \sin(C)$;

determining the red value (r) in at least approximate accordance with the relation:

$$r = \frac{\sigma + \eta}{3};$$

determining the blue value (b) in at least approximate accordance with the relation:

$$b = \frac{1}{2} \cdot \left[ (\sigma - r) \pm \sqrt{2 \cdot I^2 - (\sigma - r)^2 - 2 \cdot r^2} \right]; \text{ and}$$

determining the green value (g) in at least approximate accordance with one or more of the relations:

$$g = \sigma - r - b = \frac{1}{2} \cdot \left[ (\sigma - r) \mp \sqrt{2 \cdot I^2 - (\sigma - r)^2 - 2 \cdot r^2} \right]; \text{ and}$$

rendering said color image data.

45. The method of claim 44, wherein the light energy associated with the scene comprises reflections of light from an illumination source at an illumination level, whereby the hue value is substantially invariant to changes in the illumination level.

46. The method of claim 44, wherein the light energy associated with the scene comprises reflections of light from an illumination source having an illumination color, whereby the hue value is, but for a correction factor, the same as under white illumination.

47. The method of claim 44, whereby the hue and intensity values are substantially invariant to changes of each other.

48. The method of claim 44, wherein the sensing step comprises measuring three primary color values; and the generating step comprises converting the three primary color values for the given pixel to a set of values comprising the chroma value, the hue value, and the intensity value.

49. The method of claim 48, wherein the three primary color values are red, green, and blue.

50. The method of claim 49, wherein the red value is denoted r, the green value denoted g, and the blue value denoted b, and the converting step comprises:
determining the intensity value (I) in at least approximate accordance with the relation: $I = \sqrt{r^2 + g^2 + b^2}$.

51. The method of claim 50, wherein the converting step further comprises:
determining a quantity ($\beta$) in at least approximate accordance with the relation:

$$\beta = \cos^{-1}\left( \frac{2r - g - b}{2\sqrt{I^2 - rg - rb - bg}} \right); \text{ and}$$

determining the hue value (H) in at least approximate accordance with the relation:

$$H = \begin{cases} \beta, & g > b \\ 2\pi - \beta, & \text{otherwise.} \end{cases}$$

52. The method of claim 51, wherein one or more of the determining steps is accomplished by table look-up.

53. The method of claim 50, wherein the converting step further comprises:

determining the chroma value (C) in at least approximate accordance with the relation:

$$C = \cos^{-1}\left(\frac{r+g+b}{\sqrt{3} \cdot I}\right).$$

54. The method of claim 53, wherein one or more of the determining steps is accomplished by table look-up.

55. The method of claim 44, further comprising:
determining whether to add or subtract the square root in the relation defining the blue value and the green value, based on the hue value.

56. The method of claim 44, wherein one or more of the determining steps is accomplished by table look-up.

57. The method of claim 44, further comprising:
determining whether the chroma value is legal; and
based on the determining step, conditionally performing the converting step.

* * * * *